United States Patent
Collins et al.

(10) Patent No.: US 12,183,872 B2
(45) Date of Patent: Dec. 31, 2024

(54) BATTERY MODULE FRAME CONFIGURATION

(71) Applicant: Rivian IP Holdings, LLC, Irvine, CA (US)

(72) Inventors: Tyler Collins, Irvine, CA (US); Nathaniel C. Wynn, Tustin, CA (US); Kyle Butterfield, Rancho Santa Margarita, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 68 days.

(21) Appl. No.: 17/665,157

(22) Filed: Feb. 4, 2022

(65) Prior Publication Data
US 2022/0200087 A1    Jun. 23, 2022

Related U.S. Application Data

(63) Continuation of application No. 16/682,782, filed on Nov. 13, 2019, now Pat. No. 11,276,898.
(Continued)

(51) Int. Cl.
*H01M 10/04*    (2006.01)
*H01M 50/204*    (2021.01)
(Continued)

(52) U.S. Cl.
CPC ... *H01M 10/0486* (2013.01); *H01M 10/0413* (2013.01); *H01M 50/204* (2021.01);
(Continued)

(58) Field of Classification Search
CPC ............. H01M 50/264; H01M 50/249; H01M 50/517; H01M 50/204
See application file for complete search history.

(56) References Cited

U.S. PATENT DOCUMENTS 3,988,170 A * 10/1976 Koch ................... H01M 50/204
429/163
8,216,709 B2    7/2012 Takeguchi
(Continued)

FOREIGN PATENT DOCUMENTS

DE    102015104626 A1    10/2015
EP    3 316 343    5/2018
(Continued)

OTHER PUBLICATIONS

International Search Report and Written Opinion of PCT/US2019/061192 dated Mar. 19, 2020.

*Primary Examiner* — Matthew T Martin
*Assistant Examiner* — Jessie Walls-Murray
(74) *Attorney, Agent, or Firm* — HALEY GUILIANO LLP

(57) ABSTRACT

A battery system includes a battery frame, a battery module, and a polymeric seat. The battery frame includes a horizontal bottom plate and a plurality of members that extend in a vertical direction from the bottom plate. The battery module includes at least one battery cell enclosed inside body of the battery module. The battery module also includes an attachment surface fixedly attached to the body and one or more supports that extend downward from to the body. The attachment surface is fixedly attached to one or more of plurality of members to generate a force on the one or more supports in a direction of the bottom plate. The polymeric seat is fixedly attached to either the one or more supports or the battery frame and removably contacts the other of the one or more supports or the battery frame. The polymeric seat is compressed in response to the force.

17 Claims, 3 Drawing Sheets

Related U.S. Application Data

(60) Provisional application No. 62/760,463, filed on Nov. 13, 2018.

(51) Int. Cl.
  *H01M 50/242* (2021.01)
  *H01M 50/244* (2021.01)
  *H01M 50/258* (2021.01)
  *H01M 50/262* (2021.01)
  *H01M 50/209* (2021.01)
  *H01M 50/249* (2021.01)

(52) U.S. Cl.
  CPC ....... *H01M 50/242* (2021.01); *H01M 50/258* (2021.01); *H01M 50/262* (2021.01); *H01M 50/209* (2021.01); *H01M 50/244* (2021.01); *H01M 50/249* (2021.01)

(56) References Cited

U.S. PATENT DOCUMENTS

| | | | |
|---|---|---|---|
| 9,017,845 | B2 | 4/2015 | Bender |
| 11,276,898 | B2 * | 3/2022 | Collins ............... H01M 10/625 |
| 2003/0017384 | A1 | 1/2003 | Marukawa et al. |
| 2009/0325049 | A1 | 12/2009 | Niedzwiecki et al. |
| 2009/0325051 | A1 | 12/2009 | Niedzwiecki et al. |
| 2012/0263991 | A1 * | 10/2012 | Temmyo ............. H01M 10/613 429/120 |
| 2013/0266840 | A1 * | 10/2013 | Fujii ................... H01M 50/249 429/120 |
| 2015/0222131 | A1 * | 8/2015 | Kano .................. H01M 50/249 320/112 |
| 2015/0280183 | A1 * | 10/2015 | Utley ................. H01M 50/291 429/99 |
| 2018/0170206 | A1 * | 6/2018 | Kim .................... H01M 10/613 |
| 2018/0337374 | A1 * | 11/2018 | Matecki ............. H01M 50/271 |
| 2020/0185672 | A1 | 6/2020 | Seo et al. |
| 2022/0173469 | A1 * | 6/2022 | Wynn ................. H01M 50/207 |

FOREIGN PATENT DOCUMENTS

| | | |
|---|---|---|
| KR | 20180112618 | 10/2018 |
| WO | 2018/186616 A1 | 10/2018 |

* cited by examiner

| Place the battery module within a cavity of a battery frame such that an attachment surface at a bottom portion of the battery module contacts with a bottom portion of the battery frame via a polymeric seat and the attachment surface contacts a member of the battery frame | 502 |

| Fixedly attach the battery module to the battery frame via the attachment surface and the contact with the member such that the attachment generates a force at the bottom portion of the battery frame | 504 |

| Trigger the compression of the polymeric seat in response to the force | 506 |

FIG. 5

BATTERY MODULE FRAME CONFIGURATION

CROSS-REFERENCE TO RELATED APPLICATION(s)

This application is a continuation of U.S. patent application Ser. No. 16/682,782 (now U.S. Pat. No. 11,276,898), filed Nov. 13, 2019, which claims the benefit of U.S. Provisional Patent Application No. 62/760,463, filed Nov. 13, 2018, which are hereby incorporated by reference herein in their entireties.

FIELD OF USE

The present disclosure is directed to a battery module frame configuration and more specifically to the battery module frame configuration that provides blind access support as well as protection to battery cells in the battery module.

SUMMARY

Current electric vehicles typically package a large number of battery cells into battery modules. The battery cells provide and/or supplement drive power for the vehicle. However, the vehicle has limited space for these battery modules and often, the battery cells are damaged due to impact of the vehicle during operation. Also, the structural support provided for these battery modules in the vehicles generally make it exceedingly difficult to reach certain portions of these battery modules in order to install, service, replace or maintain batteries in these modules. Thus, it is necessary to protect the battery modules during vehicle operation, as well as to provide generalized structural support of the modules for the vehicle that allows for easy access to the modules.

In view of the foregoing, systems and methods are disclosed herein that provide blind access support and protection to batteries.

In some embodiments, a battery system according to the present disclosure includes a battery frame including a horizontal bottom plate and a plurality of members that extend in a vertical direction from the bottom plate. The battery system also includes a battery module including at least one battery cell, a body, wherein the at least one battery cell is enclosed inside the body, an attachment surface fixedly attached to the body and one or more supports that extend downward from to the body, wherein the attachment surface is fixedly attached to one or more of the plurality of members to generate a force on the one or more supports in a direction of the bottom plate. The battery module also includes a polymeric seat, wherein the polymeric seat is fixedly attached to either the one or more supports or the battery frame and removably contacts the other of the one or more supports or the battery frame, and wherein the polymeric seat is compressed in response to the force.

In some embodiments, the at least one battery cell includes a plurality of battery cells. In some embodiments, the at least one battery module further includes a coolant path. In some embodiments, the coolant path comprises a cooling manifold.

In some embodiments, the attachment surface extends along a parallel plane to a top plane of the plurality of members. In some embodiments, the attachment surface interfaces with an upper surface of least one of the plurality of members.

In some embodiments, the one or more supports include two supports that extend downwards from opposite sides of the body. In some embodiments, the one or more supports are angled at a bottom proximate to the bottom plate and the battery frame includes a corresponding angled surface.

In some embodiments, angle of the one or more supports and the corresponding angled surface of the battery frame have a substantially identical angle. In some embodiments, the corresponding angled surface of the battery frame includes a surface of one or more of the plurality of members such that the polymeric seat attached to the one or more supports rests on the surface of the one or more of the plurality of members.

In some embodiment, the material of the polymeric seat is selected to be elastomeric to dampen vibrations associated with vehicle operation. In some embodiments, the polymeric seat is fixedly attached to each of the one or more supports and removably contacts the battery frame. In some embodiments, the polymeric seat is fixedly attached to the battery frame and removably contacts each of the one or more supports.

In some embodiments, the plurality of members extends vertically at an angle that is substantially perpendicular to the horizontal bottom plate. In some embodiments, the plurality of members include a front member, a rear member, and a plurality of opposite side members. In some embodiments, the plurality of cross members extend between the side members, wherein the battery frame and the cross members define a plurality of cavities.

In some embodiments, the battery module is attached within a first cavity of the plurality of cavities and wherein another battery module is attached within a second cavity of the plurality of cavities.

In some embodiments, the present disclosure is directed to a method for providing a blind access support and protection to a battery module including a body and a battery cell enclosed inside the body. The method includes placing the battery module within a cavity of a battery frame, wherein an attachment surface at a bottom portion of the battery module contacts a bottom portion of the battery frame via a polymeric seat and an attachment surface of the battery module contacts a member of the battery frame; fixedly attaching the battery module to the battery frame via the attachment surface and the contact with the member, wherein the attachment generates a force at a bottom portion of the battery frame; and causing compression of the polymeric seat in response to the force.

In some embodiments, the method includes fixedly attaching the polymeric seat to the bottom of the battery module, wherein the polymeric seat removably contacts the battery frame.

In some embodiments, the method includes fixedly attaching the polymeric seat to the bottom portion of the battery frame, wherein the polymeric seat removably contacts the battery module.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 5 is a flowchart of a method for providing a blind access support and protection to a battery module in accordance with some embodiments of the disclosure.

DETAILED DESCRIPTION

Figure 1:
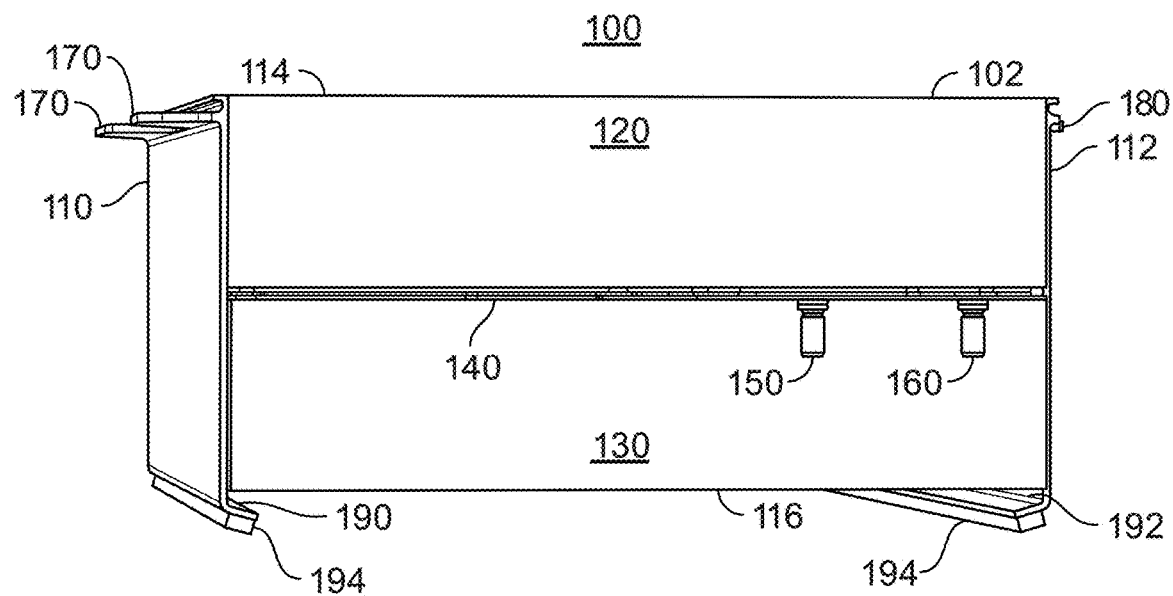
FIG. 1 depicts an exemplary battery module in accordance with some embodiments of the present disclosure.

Systems and methods are disclosed herein that provide blind access support as well as protection to battery cells. In the present disclosure, battery cells are situated within a battery frame that is located and designed to attach and protect the battery cells while providing structural support for the vehicle. The battery cells may be part of modules that include other components such as control systems and cooling for the cells and may be densely packed within the frame. Accordingly, such attachment of the battery modules to the battery frame may be at least partially "blind," e.g., such that there are no or extremely limited opportunities for a technician, robot, or assembly fixture to access a portion of the battery module and frame for attachment by hands, tools, and traditional fasteners. In some embodiments, the battery frame may form a plurality of cavities for insertion of a plurality of battery modules such that a top attachment portion of each of the battery modules contacts an upper portion of the frame and a bottom portion of each of the battery modules contacts a lower portion of the frame. However, the bottom portion of the battery module that contacts the lower portion of the frame is blind and inaccessible. This may be particularly true where a base plate, which may include a single unitary component, or a plurality of components is permanently attached to the lower portion of the frame such that there is no bottom access to the frame during assembly.

In an exemplary embodiment of the present disclosure, the frame structure may be designed to secure and support the battery modules, while limiting the effects of shocks and vibrations of the vehicles on the batteries during normal usage (e.g., to prevent wear and damage) including protecting the batteries from getting crushed in crash scenarios. In some embodiments, the battery system may include a removeable top lid and a permanent bottom plate of the frame. Thus, it may not be possible to have access to the bottom of the battery module at the bottom of the pack to install fasteners for secure attachment of the battery module with the frame. In one embodiment of the present disclosure, suitable installation and coupling of battery modules at this blind lower area of the battery system may be facilitated by one or more supports of the battery module and a polymeric member coupled between the support and lower portions of the battery frame, such as the bottom plate and/or vertical members of the battery frame. The polymeric member may be fixedly attached to either the one or more supports of the battery modules or the battery frame, allowing for easy insertion and removal of the battery module.

In some embodiments of the present disclosure, the polymeric member is made of an elastomeric material such as a foam, sponge or solid. When the battery module is installed into the battery pack, the relative position of the battery module supports, and the battery frame may be such that the polymeric member gets compressed between the battery module structure and the battery frame structure. This compression of the polymeric member compensates for manufacturing and assembly tolerances (e.g., of the module, battery frame, cross members, etc.) due to the ability of the polymeric member to compress while still offering support and coupling to the battery module. Accordingly, in some embodiments of the present disclosure, blind attachment via the supports and the polymeric member may provide a secure and soft support to the module and dampen effects of shocks, vibrations and noise from the vehicle from transferring directly to the module (limiting movement of the battery module within the frame) without a need for fastening or other access in the blind portions of the battery system. In this manner, the bottom plate of the battery frame may be a permanent (e.g., unitary or welded) component for purposes of providing desirable structural characteristics without having to access components located near the bottom plate. Additionally, since the polymeric member is only bonded to one side (module or frame) and does not restrain the module, the battery module can be easily removed from the pack by simply pulling it out from the battery frame.

FIG. 1 depicts an exemplary battery module 100 in accordance with some embodiments of the present disclosure. As shown, in one example, the battery module 100 includes a body 102 having a first end 110 as a front facing portion and a second end 112 opposite to the first end 110 as a rear facing portion. The body 102 also includes a top portion 114 and a bottom portion 116. In the example shown in FIG. 1, the body 102 is shaped as rectangular prism providing area to support components therein. In one embodiment, one or more battery cells are enclosed inside the body 102 of the battery module 100. In some embodiments, the battery cells may be cylindrically shaped. In some embodiments, the battery cells may be prismatic in shape (e.g., rectangular).

In one example as shown in FIG. 1, the battery module 100 includes two layers of battery cells, a top layer 120 and a bottom layer 130, which are stacked on top of each other and separated by a cooling plate 140. Specifically, the first layer 120 is located in the top portion 114 and the bottom layer 130 is located in the bottom portion 116. In some embodiments, the battery cells in the top layer 120 and the bottom layer 130 are oriented in opposite directions. The cooling plate 140 functions to circulate coolant between the top and bottom layers 120 and 130 respectively, effectively transferring excess heat out of the cells and maintaining an operating temperature to enable optimal operation of the battery cells. In one embodiment, the battery cells in top and bottom layers 120 and 130 are coupled to the cooling plate 140 using any suitable coupling element. In some embodiments, the coupling element may be an adhesive, a nonconductive shroud, or both. The coupling element may provide good thermal conductivity between the battery cells and cooling plate 140. As illustrated, coolant intake and outlets 150 and 160 are attached to the cooling plate 140 in the bottom portion 116 of the module 100.

Although, not shown the battery module may also include other components such as controls and electrical contacts/connections, such as protective switches and other circuitry that regulates the charging and sourcing of electricity from the batteries. In one embodiment, the battery module has a body that provides structural support for the components thereof. As shown in FIG. 1, the battery module 100 may also include an attachment surface fixedly attached to the body 102 for attaching to a battery frame 200 (FIG. 2), such as attachment surfaces 170 and 180 that extend from the first and the second ends 110 and 120 of the body 102 in FIG. 1. It will be understood that this attachment is merely exemplary, and attachment may be performed in other suitable manners to fixedly attach the battery module to the battery frame as described herein.

Figure 2:
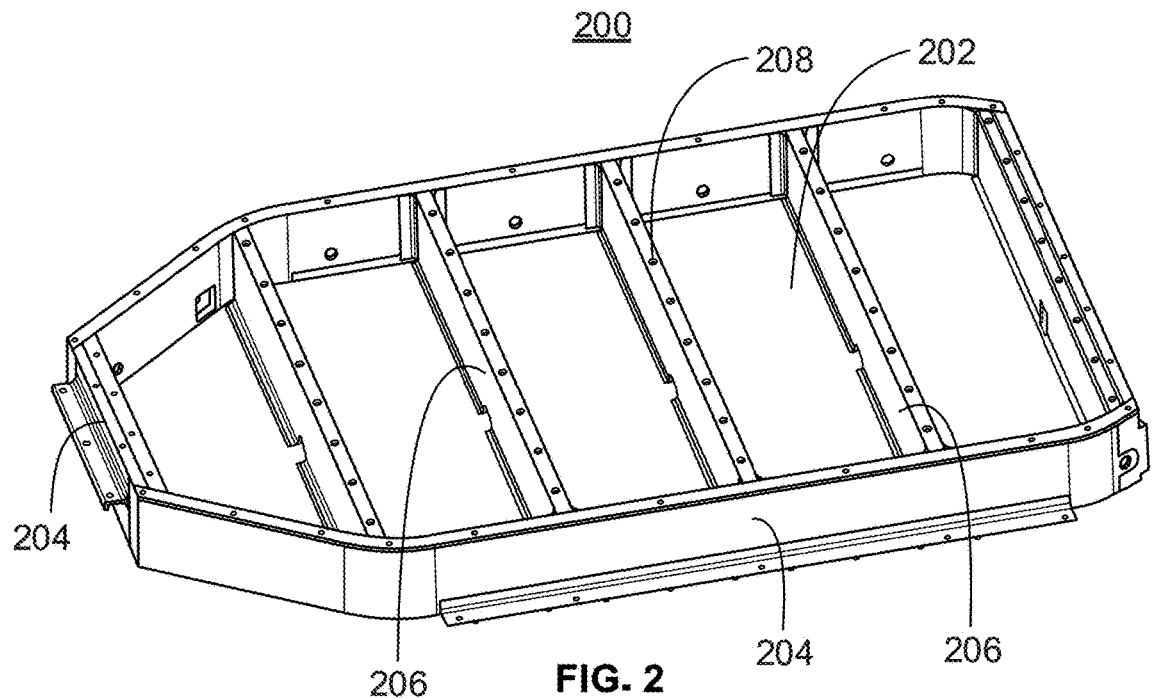
FIG. 2 depicts an exemplary battery frame in accordance with some embodiments of the present disclosure.

As illustrated in FIG. 1, supports 190 and 192, e.g., a front and rear support respectively extend from the battery module body 100 and have an angular shape that is designed to interface with a corresponding portion of the battery frame 200 (FIG. 2). In one example, the angle of the front and rear supports 190 and 192 respectively, relative to a horizontal axis, is less than 25 degrees. In another example, the angle of the front and rear supports 190 and 192 respectively is approximately 15 degrees. In another example, the angles of the front and rear supports 190 and 192 respectively is approximately 90 degrees. It will be understood that the angle measurements are merely exemplary and any suitable angles can be used.

As depicted in FIG. 1, a polymeric seat 194 is attached to each of the supports 190 and 192 of the battery module 100 along a bottom surface such that the polymeric seat 194 directly contacts the battery frame 200 (FIG. 2) and not the supports 190 and 192. Although, not depicted, in one embodiment, the polymeric seat 194 may be attached to only one of the supports 190 and 192 of the module 100. In one embodiment, the polymeric seat 194 is made of suitable material (e.g. elastomeric) that the polymeric seat 194 compresses when the battery module 100 is installed in the battery frame 200 (FIG. 2). For example, the polymeric seat 194 may be made of silicon, polyurethane, or neoprene. In one embodiment, the polymeric seat 194 is fixedly attached to either or both of the supports 190 and 192 of the module 100 by an adhesive and releasable from the battery frame 200 (FIG. 2). Thus, in this manner, the polymetric seat 194 is bonded to the battery module 100.

Although not depicted, in another embodiment, the polymeric seat 194 is fixedly attached to the frame 200 yet releasable with respect to the supports 190 and 192 from the module 100. Thus, in this manner, the polymetric seat 194 is bonded to the frame 200. In some embodiments of the disclosure, the polymeric seat 194 has a range of compression that compensates for manufacturing and assembly tolerances (e.g., of the module, battery frame, cross members, etc.) due to the ability of the polymeric seat to compress while still offering support and coupling over a wide range of compression percentage. In one example, the compression of the polymeric seat 194 is in a range of 20% to 80% compression. In another example, the compression of the polymeric seat includes approximately 45% compression. In some embodiments, supports 190 and 192 are not continuous members along their respective ends of battery module 100. For example, portions (e.g., one or more center portions) of supports 190 and 192 may be removed to reduce the weight of the battery modules. It will be understood that to the extent that portions of supports 190 and 192 are removed, similar portions of polymeric seat 194 will also be removed.

FIG. 2 depicts an exemplary battery frame 200 in accordance with some embodiments of the present disclosure. The frame 200 includes a bottom surface having a horizontal bottom plate 202 such as a single metal sheet (or other suitable material) or a plurality of welded metal sheets (or other suitably bonded materials). In one embodiment, the bottom plate 202 of the frame 200 is permanently attached to the frame and provides for desirable structural rigidity for the vehicle but may limit access to the bottom portion of the frame 200 during installation of battery modules, as bottom-side access by technicians and robots is unavailable. A plurality of side members 204 extend vertically from the bottom plate 202 to complete the frame 200, which may include front, side, and rear portions of the frame as well as cross members 206 connected between the exterior parts of the frame 200. Accordingly, the cross members 206 extend between the side members 204 creating cavities in the frame 200. Although not depicted in FIG. 2, cross members may also extend between the front and rear of the vehicle and/or may form a grid, based on desired design and support considerations for the vehicle. Moreover, it will be understood that the battery frame depicted in FIG. 2 is exemplary and the battery frame may include a variety of suitable shapes and proportions based on desired end-use and structural characteristics.

In one embodiment, upper surfaces of the side and the cross members 204 and 206 respectively include suitable attachment surfaces for interfacing with the attachment surfaces 170 and 180 of the battery module 100. In one example, the upper surfaces of the side and the cross members 204 and 206 respectively include threaded holes 208, which allow the battery module 100 to be removably bolted within the battery frame 200. In one embodiment, a bottom surface of the battery frame 200 may include a suitable mating surface 203 (FIG. 4) for interfacing the supports 190 and 192 of the battery module 100. In some embodiments, the mating surface 203 (FIG. 4) is shaped at an angle that is substantially identical to the angle of the supports 190 and 192. In one embodiment, the angular shape to the supports 190 and 192 and the mating surface 203 (FIG. 4) provides a more desirable force distribution (e.g., at least partially normal to downward force due to the weight of the battery module and force of battery attachment) as opposed to a purely flat support and battery frame interface.

Figure 3:
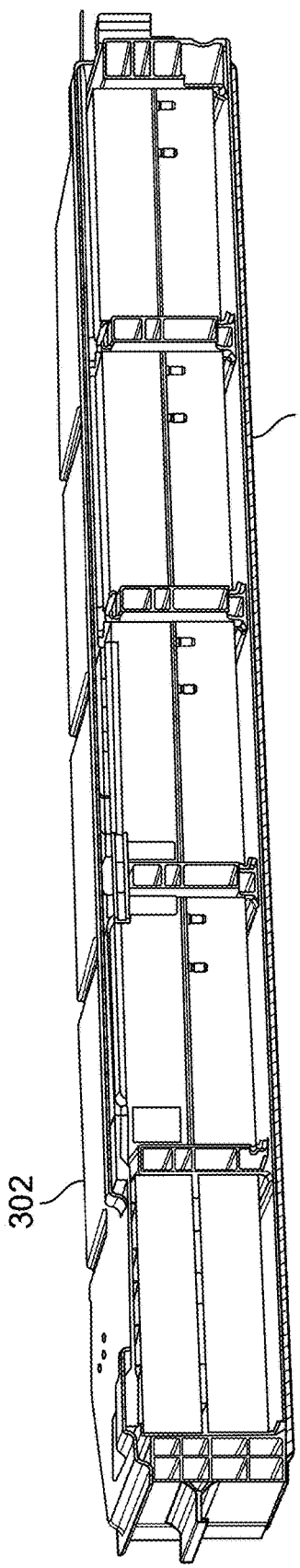
FIG. 3 depicts a battery system illustrating a cross section of the battery frame with a number of battery modules installed therein in accordance with some embodiments of the present disclosure.
Figure 4:
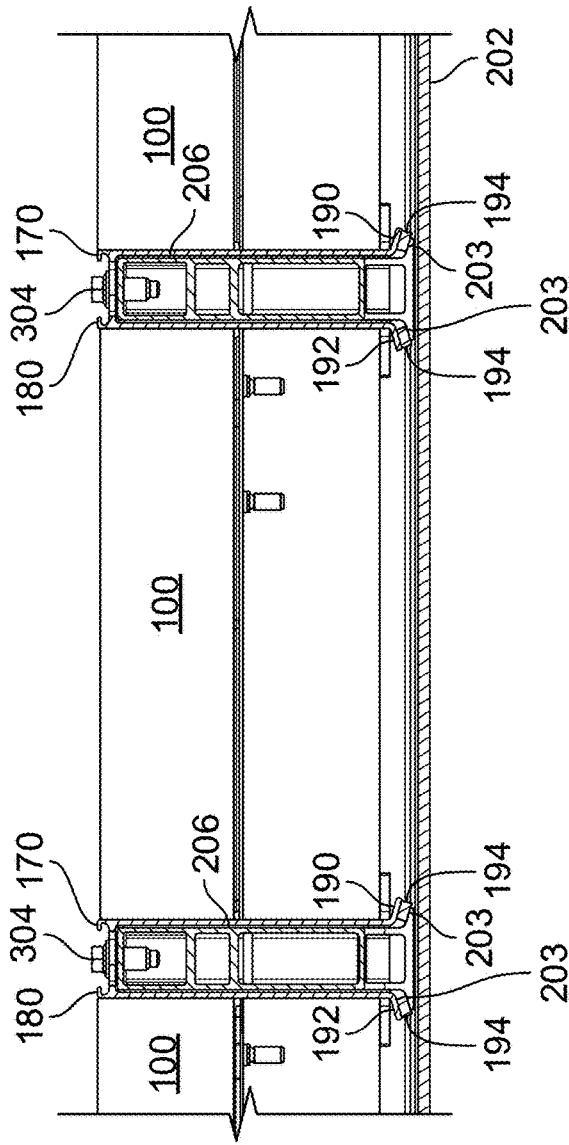
FIG. 4 depicts a close-up view of the cross-section of FIG. 3.

FIG. 3 depicts a battery system 300 illustrating a cross section of the battery frame with the battery modules 100 installed therein. Although four battery modules are shown, it will be understood that the number of battery modules are merely exemplary and any suitable number of the battery modules can be installed. Also shown is a removable cover such as a lid 302. FIG. 4 depicts a close-up view of the cross-section of FIG. 3. As illustrated in FIGS. 3 and 4, the attachment surfaces 170 and 180 of the battery modules 100 rest upon upper surfaces of the cross members 206 while the supports 190 and 192 including the polymeric seat 194 interfaces with a bottom angled portion of the cross members 206 (e.g., where the cross members are attached (e.g., welded) to the bottom plate 202).

As illustrated in one embodiment, the battery modules 100 are securely attached to the cross members 206 of the frame 200, by for example, top side fastening bolts 304. In some embodiments, the attachment surfaces of adjacent battery modules are offset such that each attachment surface is separately attached by a respective fastening bolt 304. In some embodiments, the attachment surfaces of adjacent battery modules overlap each other vertically or are adjacent to each other laterally such that a single bolt 304 can be used to secure two attachments surfaces from adjacent battery modules. In some embodiments, two or more attachment surfaces are provided on the ends of the battery modules. In some embodiments, the attachment surfaces form a nested pattern with the attachment surfaces of an adjacent battery module.

In some embodiments, the design of the battery pack frames and the battery modules described herein provides convenient access to the top of the battery modules, which can be easily removed using the exposed topside fastening bolts 304. It will be understood that the fastening bolts are merely exemplary and any suitable fasteners can be used. In one embodiment, the weight of the battery module 100 and the downward force of attachment cause the polymeric seat 194 to compress between the supports 190 and 192 of the battery module 100 and the corresponding mating surface 203 of the battery frame 200. Accordingly, in this manner, not only is the battery module 100 secured within the battery frame 200 during vehicle operation but is also easily installed, maintained, and replaced as needed.

FIG. 5 is a flowchart 500 of a method for providing a blind access support and protection to a battery module. In some embodiments, the battery system comprises a battery module having a body enclosing at least one battery cell and a frame to support the battery module. As shown in FIG. 1, battery cells are enclosed within top layer 120 and bottom layer 130 of a body 102 of the battery module. Also, attachment surfaces 170 and 180 are fixedly attached to the body 102 for attaching to a battery frame 200 in FIG. 2. In one embodiment, as shown in FIG. 1, polymeric seat 194 is attached to bottom portion of the battery module 100 such that the polymeric seat 194 directly contacts the battery frame 200 in FIG. 2. In another embodiment, the polymeric seat is attached to the bottom portion of the battery frame 200 in FIG. 2. Also, as shown in FIG. 2, the battery frame 200 includes side members 204 forming a plurality of cavities within the frame 200.

At step 502, the battery module is placed within a cavity of a battery frame such that an attachment surface at a bottom portion of the battery module contacts with a bottom portion of the battery frame via a polymeric seat and the attachment surface contacts a member of the battery frame. At step 504, the battery module is fixedly attached to the battery frame via the attachment surface and the contact with the member such that the attachment generates a force at the bottom portion of the battery frame. As discussed above, for example, the force causes the polymeric seat to compress between the battery module and the frame. At step 506, compression of the polymeric seat is triggered in response to the force. Accordingly, in this manner, not only is the battery module 100 secured within the battery frame 200 during vehicle operation but is also easily installed, maintained, and replaced as needed.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery system, comprising:
a battery frame comprising a plurality of frame members;
a battery comprising:
 a body at least partially enclosing at least one battery cell;
 a pair of supports on opposite lateral sides of the body, wherein each support of the pair of supports comprises a portion that extends downward from a bottom of the body and is angled towards a respective opposite lateral side of the body; and
 attachment surfaces that extend laterally away from a top portion of the body and interface with upper surfaces of adjacent frame members of the plurality of frame members.

2. The battery system of claim 1, wherein the body encloses a plurality of battery cells.

3. The battery system of claim 1, wherein the attachment surfaces extend along a plane parallel to a top plane of the plurality of frame members.

4. The battery system of claim 1, wherein the attachment surfaces are fixedly attached to upper surfaces of the plurality of frame members.

5. The battery system of claim 4, wherein the attachment surfaces are fixedly attached by fasteners configured to interface with threaded holes of the upper surfaces of the plurality of frame members.

6. The battery system of claim 1, wherein each of the plurality of frame members receives attachment surfaces from batteries on either side of the plurality of frame members.

7. The battery system of claim 6, wherein each of the batteries are laterally offset on a respective frame member of the plurality of frame members.

8. The battery system of claim 1, wherein each of the adjacent frame members are separately attached to each of the attachment surfaces.

9. The battery system of claim 6, wherein at least two of the attachment surfaces overlap.

10. The battery system of claim 9, wherein a fastener is used to affix the at least two of the attachment surfaces together.

11. The battery system of claim 1, wherein the plurality of frame members comprises a front member, a rear member, and a plurality of opposite side members.

12. The battery system of claim 1, further comprising a plurality of cross members that define a plurality of cavities arranged along the battery frame.

13. The battery system of claim 1, wherein the battery is attached within a first cavity arranged along the battery frame and wherein another battery is attached within a second cavity arranged along the battery frame.

14. A battery system, comprising:
a battery frame; and
a battery module comprising:
 a body configured to accommodate at least one battery cell;
 a pair of supports on opposite lateral sides of the body, wherein each support of the pair of supports comprises a portion that extends downward from a bottom of the body and is angled towards a respective opposite lateral side of the body; and
 one or more attachment surfaces extending laterally away from a portion of the body above a bottom portion.

15. The battery system of claim 14, wherein the one or more attachment surfaces extend along a plane parallel to a top plane of the battery frame.

16. A method of assembling a battery system, the method comprising:

placing a battery within a cavity of a battery frame, wherein the battery comprises:
- a body configured to accommodate at least one battery cell,
- an attachment surface that extends laterally away from the body, and
- a pair of supports on opposite lateral sides of the body, wherein each support of the pair of supports comprises a portion that extends downward from a bottom of the body and is angled towards a respective opposite lateral side of the body;

fixedly attaching the battery to the battery frame via the attachment surface; and causing a vertical compression of the battery towards a bottom plate of the battery frame.

17. The method of claim 16, further comprising arranging a plurality of cross-members within the cavity of the battery frame, wherein an arrangement of the plurality of cross-members define a plurality of cavities arranged along the battery frame.

\* \* \* \* \*